United States Patent [19]

Karbassiyoon et al.

[11] Patent Number: 4,597,785
[45] Date of Patent: Jul. 1, 1986

[54] METHOD OF AND APPARATUS FOR MAKING OPTICAL PREFORMS WITH A PREDETERMINED CLADDING/CORE RATIO

[75] Inventors: Kamran Karbassiyoon; Francis I. Akers; Larry J. Raplee; Daniel G. Fletcher, all of Roanoke, Va.

[73] Assignee: ITT Corporation, New York, N.Y.

[21] Appl. No.: 636,525

[22] Filed: Aug. 1, 1984

[51] Int. Cl.$^4$ ..................... C03B 37/012; C03B 37/07
[52] U.S. Cl. .......................................... 65/2; 65/3.11; 65/29
[58] Field of Search ................... 65/3.11, 12, 13, 3.12, 65/29, 2

[56] References Cited

U.S. PATENT DOCUMENTS

| | | | |
|---|---|---|---|
| 4,101,300 | 7/1978 | Imoto | 65/29 X |
| 4,154,591 | 5/1979 | French | 65/3.11 X |
| 4,428,760 | 1/1984 | Oh | 65/12 X |

FOREIGN PATENT DOCUMENTS 2481445  10/1981  France ................... 65/3.11

Primary Examiner—Kenneth M. Schor
Attorney, Agent, or Firm—John T. O'Halloran

[57] ABSTRACT

An arrangement for collapsing tubular formations into optical preforms includes a control arrangement which controls the ratio of hydrogen to oxygen in an oxyhydrogen burner flame during the collapsing operation toward overabundance of hydrogen when it is desired to increase the degree of evaporation of glass from the outer surface of a tubular proportion being collapsed. This arrangement is used for bringing the ratio of the cross-sectional area of the core region to that of the cladding region in an optical preform resulting from the collapse into or close to a predetermined range, regardless of the initial value of this ratio in the original tubular formation, by evaporating more or less of the glass from the outside of the tubular formation during the collapse.

2 Claims, 5 Drawing Figures

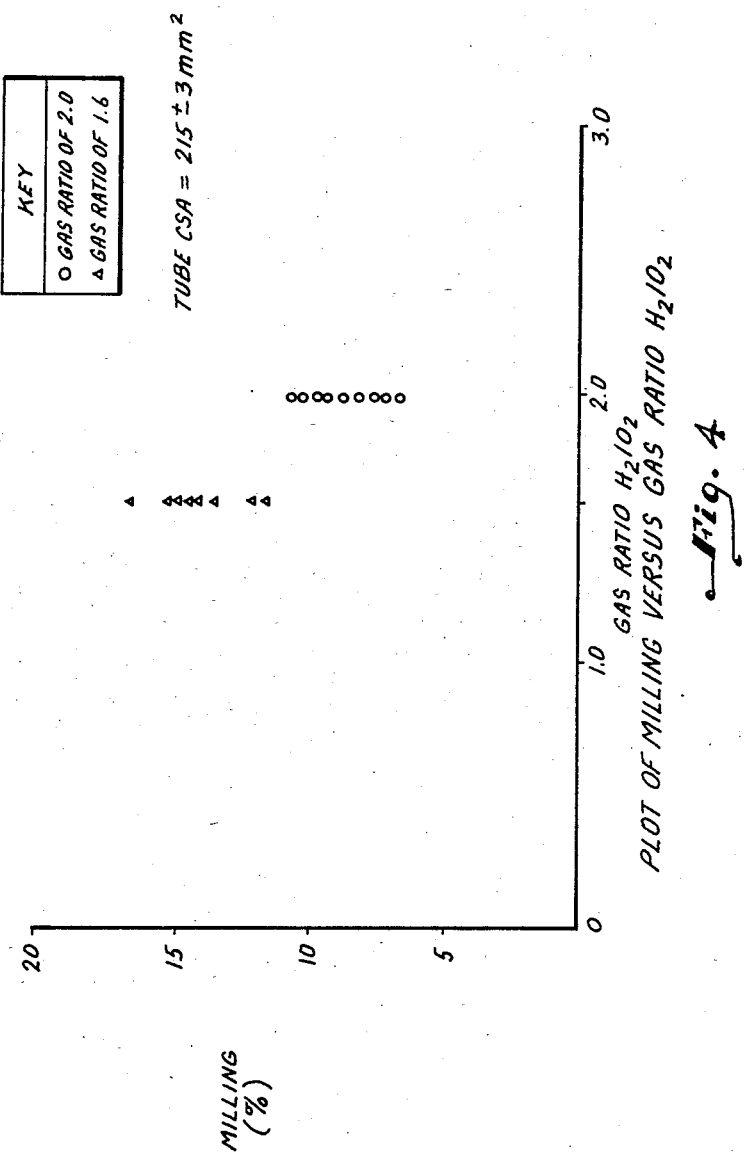

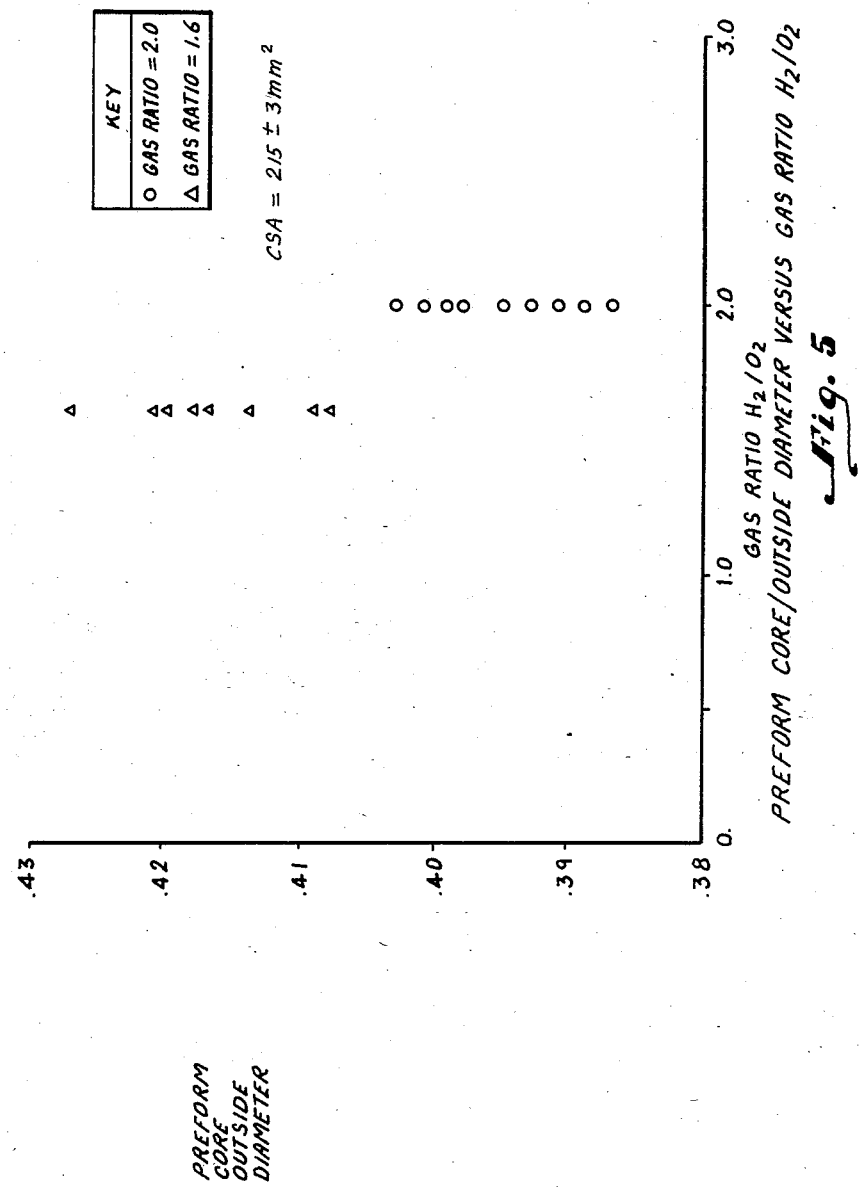

METHOD OF AND APPARATUS FOR MAKING OPTICAL PREFORMS WITH A PREDETERMINED CLADDING/CORE RATIO

BACKGROUND OF THE INVENTION

The present invention relates to the manufacture of optical fibers in general, and more particularly to a method of and an apparatus for making solid cross-section optical preforms with a cladding/core ratio in a predetermined range from tubular bodies.

There are already known various methods of, and arrangements for, producing optical fibers, most of which involve first the production of an optical preform and then the drawing of the optical fiber from the fiber. One way of producing the optical preform is the modified chemical vapor deposition method, during the preformance of which a gaseous medium is caused to flow through the interior of a tubular substrate body. The gaseous medium includes reactants which decompose or interreact or are otherwise chemically transformed when heated to transformation temperatures into solid glass constituents. The tubular substrate is locally heated from the outside and the heating zone is gradually moved longitudinally and/or circumferentially of the tubular substrate, resulting in transformation of the reactants into the glass constituents, precipitation of the glass constituents from the gaseous medium in the form of glass soot and deposition of such glass soot on the internal surface of the tubular substrate and subsequent fusing of the deposited glass soot with the substrate and/or any previously deposited internal layers. The modified chemical vapor deposition process is conducted in a plurality of passes or increments. The composition of the gaseous medium can be changed from one pass to another so as to change the chemical composition and the optical properties of the consecutively deposited layers of glass. After the deposition operation is completed, the resulting glass formation, which is still tubular, is often caused to collapse into a solid cross-section optical glass preform, which is subsequently used in the optical fiber drawing operation.

The cross-sectional areas of the substrates and/or the cross-sectional areas of the core layers of the tubular formations differ from one tubular formation to another, so that the ratios of such areas are also different for different tubular formations. This means that, unless special measures are taken, the ratio of the cladding region to the core region would also differ from one optical preform to another, such difference reflecting itself in a similar difference in the cladding/core ratio of the fibers drawn from such optical preforms. This is very disadvantageous, especially since such ratio should be kept within a very close range to assure that the optical fiber will have the desired optical properties.

To deal with this problem and to assure that the cladding/core ratio will be within the desired range for all optical fibers, it has been heretofore proposed to measure the cross-sectional area and/or wall thickness of the tubular substrate, and to control the deposition in the interior of the tubular substrate in accordance with the obtained results so as to achieve a core/cladding ratio in the resulting tubular formation that will eventually result in the desired core/cladding ratio in the optical preform and eventually in the optical fiber drawn from the latter. Yet, this procedure, which involves careful selection of the tubular substrates, careful control of the deposition process, and the maintenance of a considerable stock of tubular substrates to meet the expected needs for optical fiber preforms to be manufactured under given conditions leaves much to be desired.

SUMMARY OF THE INVENTION

Accordingly, it is a general object of the present invention to avoid te disadvantages of the prior art.

More particularly, it is an object of the present invention to provide a method of making optical fiber preforms and more particularly of collapsing tubular formations into such preforms which does not possess the disadvantages of the known methods of this type.

Still another object of the present invention is to devise a method of the above type which is effective for causing the ratio of the cross-sectional area of the cladding region to that of the core region of the optical preform to fall within predetermined limits even when the initial ratio considerably differs from one tubular formation to another.

A concomitant object of the present invention is to develop an apparatus especially suited for performing the above method.

It is yet another object of the present invention so to construct the apparatus of the above type as to be simple in construction, inexpensive to manufacture, easy to use, and reliable in operation nevertheless.

In pursuance of these objects and others which will become apparent hereafter, one feature of the present invention resides in a method of making optical fiber preforms, this method comprising the steps of producing a respective tubular glass body including an outer cladding region and an inner core region of the desired optical properties, the cross-sectional area of the cladding region being in an initial ratio particular to the respective tubular glass body with respect to the cross-sectional area of the core region; determining the initial ratio for the respective tubular glass body; collapsing the tubular glass body into the respective optical preform, including applying a flame using a combustible mixture of a gaseous fuel with an oxidizing gas to the exterior of the respective tubular glass body; and causing the ratio to fall between predetermined limits in the optical preform, including varying at least the proportion of the gaseous fuel in the mixture relative to the oxidizing gas during the collapsing step in dependence on the initial ratio toward overabundance of the fuel in the mixture when the initial ratio is above the predetermined limits, with attendant increase in the evaporation of the material of the outer cladding region of the respective tubular glass body.

According to another aspect of the present invention there is provided an apparatus for converting tubular glass bodies, each of which includes an outer cladding region and an inner core region with the cross-sectional area of the cladding region being in an initial ratio particular to the respective tubular glass body relative to the cross-sectional area of the core region, into optical preforms, this apparatus comprising means for supporting the respective tubular glass body; means for applying heat to the exterior of the respective tubular glass body at least during a collapsing operation to collapse the respective tubular glass body into the optical preform, such applying means including burner means for combusting a mixture of a gaseous fuel with an oxidizing gas; and means for causing the ratio to fall between predetermined limits, such causing means including means for varying at least the proportion of the gaseous fuel in the mixture relative to the oxidizing gas during the collapsing operation in dependence on the initial ratio toward overabundance of the fuel in the mixture when the ratio is above the predetermined limits, with attendant increase in the evaporation of the material the outer cladding region of the respective tubular glass body.

BRIEF DESCRIPTION OF THE DRAWING

Above-mentioned and other features and objects of this invention will become apparent by reference to the following description taken in conjunction with the accompanying drawing, in which:

FIG. 4 is a graphic representation of experimentally obtained results for milling versus gas ratio, with the initial cross-sectional are being within narrow bounds; and FIG. 5 is a graphic representation under similar conditions as in FIG. 4, but showing the dependency of core/cladding ratio on the gas ratio.

DESCRIPTION OF THE PREFERRED EMBODIMENT

Figure 1:
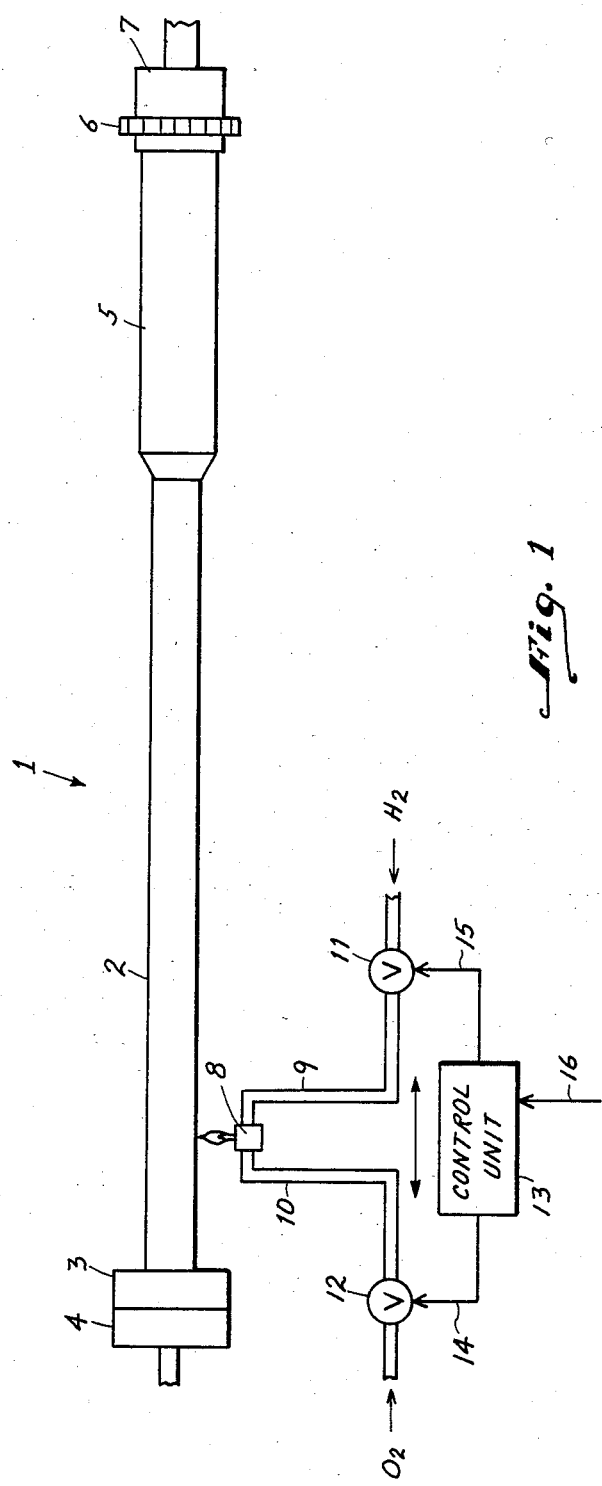
FIG. 1 is a somewhat diagrammatic representation of an apparatus equipped according to the present invention for collapsing tubular formations into optical preforms.

Referring now to the drawing in detail, and first to FIG. 1 thereof, it may be seen that the reference numeral 1 has been used to identify an apparatus equipped in accordance with the present invention in its entirety. The apparatus 1 is operative for collapsing a tubular formation 2 into a solid cross-section optical preform. The tubular formation 2 is supported in a holder or chuck 3 which, in turn, is mounted for relative rotation on a stationary support 4. The end of the tubular formation 2 which is remote from the chuck 3 merges into an exhaust pipe 5 which, in turn, is rotatably mounted, by means of rotary union 6 of a conventional construction, on a stationary support 7. During the collapsing operation, the chuck 3 rotates the tubular formation 2, together with the exhaust pipe 5, about the axis of the tubular formation 2, while the rotary union 6 provides for a substantially leakagefree communication between the interior of the exhaust pipe 5 and the interior of the support 7.

A heating device 8, such as an oxyhydrogen burner, is mounted for movement in the directions indicated by a double-headed arrow, along the tubular formation 2 substantially between the chuck 3 and the region of merger of the tubular formation 2 with the exhaust pipe 5.

Hydrogen and oxygen are separately supplied to the burner 8 through respective conduits 9 and 10 which have respective controllable valves 11 and 12 interposed therein.

The apparatus 1 of the present invention further includes a control unit 13 of well-known construction which is capable of producing electrical control signals in dependence on input data, and of issuing such control signals into respective connecting lines 14 and 15 which lead to the respective valves 12 and 11. As mentioned above, the valves 11 and 12 are adjustable, and the adjustment thereof as far as the rate of flow therethrough is concerned, is controlled by the electrical signal appearing at the particular time in the connecting line 14 or 15. The operation of the control unit 13 is dependent on input values or data which are supplied to the control unit 13 in a manner schematically indicated in FIG. 1 by an arrow 16. The valves 11 and 12 are of any conventional construction which need not be discussed in detail here. The control unit 13 is capable of independently controlling the valves 12 and 11 through the respective connecting lines 14 and 15 in such a manner that the proportion of a gaseous fuel, in this case, hydrogen, in a mixture with an oxidizing gas, in this instance, oxygen, which mixture is combusted by the burner 8, can be adjusted independently of the instantaneous volumetric rate of flow of the mixture, while the volumetric rate of flow of the mixture can be adjusted regardless of the instantaneous proportion of the fuel relative to the oxidizing gas.

The operation of the control unit 13, that is, the values of the signals appearing in the connecting lines 14 and 15, is dependent on the information set into the control unit through the input 16. This information is constituted by the cross-sectional area of the tubular substrate and/or the cross-sectional area of the inner core layer deposited in the tubular substrate during the modified chemical vapor deposition process, which information is processed by the control unit 13 to determine how much of the outer cladding layer of the tubular formation 2 is to be removed in order to obtain the desired core/cladding ratio in the optical preform.

Figure 2:
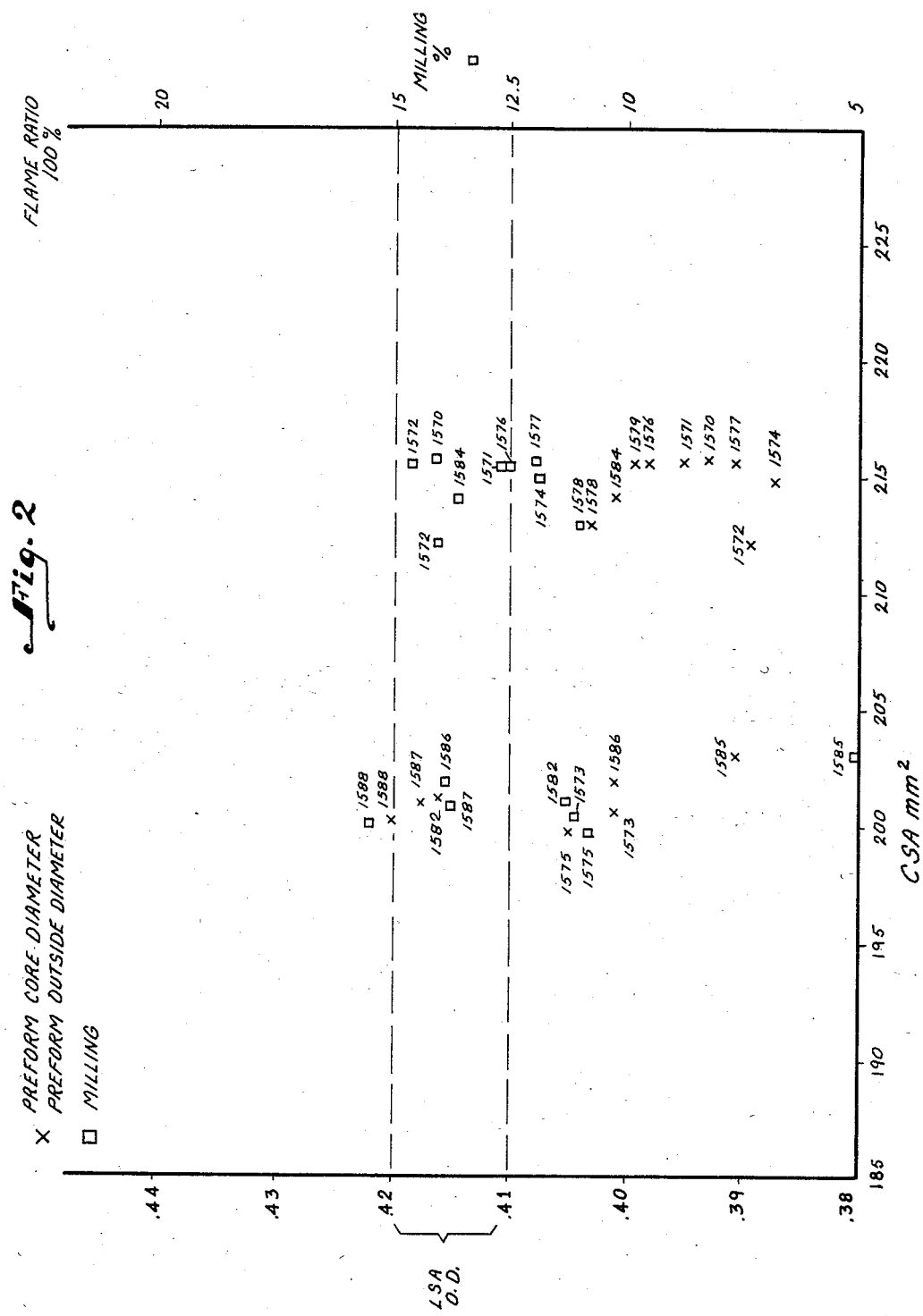
FIG. 2 is a graphic representation of relationships between initial cross-sectional areas core and cladding diameter ratio, and degree of milling, during collapse for various actual samples, at the stoichiometric oxygen/hydrogen proportion.

The material of the outer cladding region is removed primarily if not exclusively by evaporation which is brought about by the heat of the flame produced by the burner 8. As shown in FIG. 2 of the drawings, some milling or removal occurs even when the flame is at so-called stoichiometric ratio of fuel relative to the oxygen. For hydrogen as a fuel and oxygen as the oxidant the, stoichiometric ratio or proportion amounts to 2, that is two atoms of hydrogen for each atom of oxygen. The degree of the above-mentioned milling is indicated in FIG. 2 for various samples by respective squares identified by sample numbers, these squares being related to the right-hand scale which indicates the percentage of milling. On the other hand, crosses accompanied by corresponding sample numbers indicate the ratio of the preform core diameter to the preform outer diameter related to the left-hand scale. It may be seen that only a small number of the samples fall within the desired ratio range as indicated by broken lines, and that most are in the left-hand region (smaller initial cross-sectional area).

Figure 3:
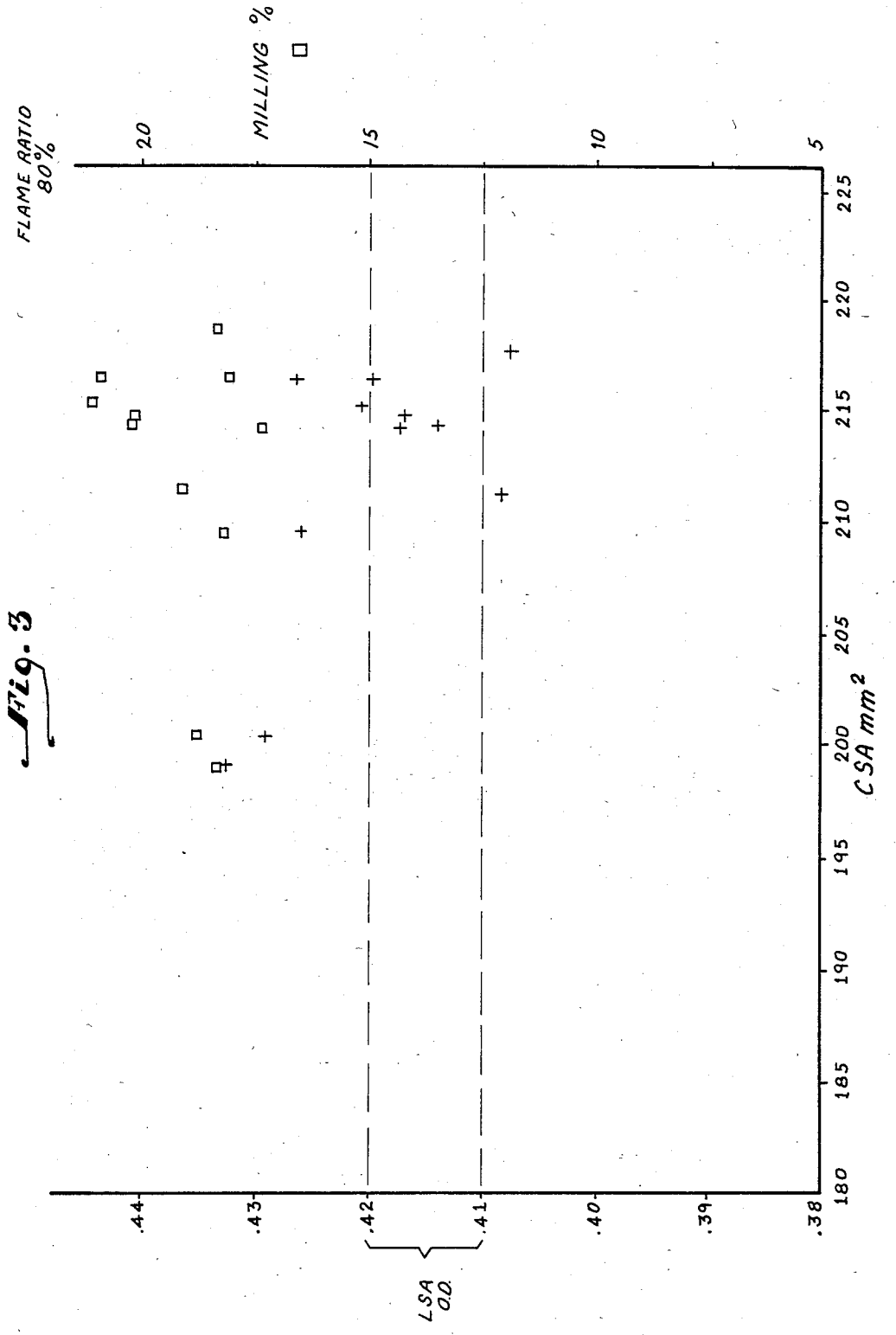
FIG. 3 is a graphic representation akin to that of FIG. 2 but at 80% of the stoichiometric proportion.

On the other hand, FIG. 3 indicates what happens when the oxygen-hydrogen ratio is adjusted, in accordance with the present invention, to amount only 80% of the stoichoimetric ratio. Under these circumstances, the percentage of milling is increased relative to that obtained in accordance with FIG. 2, so that the samples which would otherwise fall below the lower limit, as corresponding samples do in the right-hand region of FIG. 2 (larger initial cross-sectional areas), get into or closer to the desired range. On the other hand, samples corresponding in FIG. 3 to the afore-mentioned left-hand samples of FIG. 2 which were already situated in or close to the desired range at the stoichoimetric ratio, are excessively milled at the 80% of stoichometric proportion of FIG. 3 so that the core to cladding diameter ratio becomes excessive.

FIG. 4 shows the values of the percentage of milling which have been obtained with tubes of substantially the same initial cross-sectional areas at the stoichoimetric proportion (2.0) and at 80% of such proportion (1.6). It may be seen that while the percentages vary at any one of these proportions, the degree of milling is higher at the above-mentioned 80% proportion than at the stoichoimetric proportion. Moreover, FIG. 5 shows that the ratio of the core diameter to the outer diameter of the optical preform, while also varying in the range for each of the aforementioned fuel/oxygen ratios, is higher, at least statistically if not actually, at the 80% proportion than at the stoichiometric proportion.

Thus, it may be seen that, by adjusting the proportion of fuel in the combustible mixture with the oxidizing agent to overabundance of the fuel in the mixture, it is possible to increase the degree of milling and thus the ratio of the core diameter to the outer diameter of the optical preform. Experience has shown that, at less than the stoichiometric ratio, it is often necessary or desired to increase the total of volumetric flow rate of the mixture so as to reach the collapsing temperature.

The graphic representations of FIGS. 2 to 5, while showing only a limited number of samples, present a clear picture of the effect of the increase in the proportion of fuel in the mixture with the oxidizing gas on the degree of milling. Thus, the excess of fuel over oxidizing gas for any tubular formation can be easily interpolated or extrapolated, depending on the original cross-sectional areas of the tubular substrate and the core layers deposited internally thereof, so as to obtain the degree of milling which will result in the desired core-to-cladding ratio in the collapsed optical preform.

While we have described above the principles of our invention in connection with specific apparatus, it is to be clearly understood that this description is made only by way of example and not as a limitation to the scope of our invention as set forth in the objects thereof and in the accompanying claims.

We claim:

1. A method of making optical fiber preforms, comprising the steps of providing a respective tubular glass body including an outer cladding region and an inner core region of desired optical properties, said respective tubular glass body having an initial ratio of cladding cross-sectional area to core cross-sectional area;

detecting said ratio for the respective tubular glass body;

collapsing the tubular glass body into a respective optical preform having a predetermined cladding to core cross-sectional area, including applying a flame resulting from the combustion of a combustible mixture of a gaseous fuel with an oxidizing gas to the exterior of the respective tubular glass body; and causing the cladding to core cross-sectional area ratio of the optical preform to fall between predetermined limits providing desired optical properties for the optical preform, including varying at least the proportion of the gaseous fuel in the mixture relative to the oxidizing gas during the collapsing step as a function of the detected ratio to provide increased proportion of the fuel in the mixture when the detected initial ratio is above said predetermined limits, with attendant increased evaporation of the material of the outer portion of the cladding region of the respective tubular glass body.

2. The method as defined in claim 1, wherein said varying step further includes adjusting the volumetric flow rate of the mixture toward higher values with increasing proportions of the fuel in the mixture.

* * * * *